United States Patent
Puri et al.

(10) Patent No.: US 9,683,611 B2
(45) Date of Patent: Jun. 20, 2017

(54) REDUCED DRAG FRONT AXLE SHIFT MECHANISM

(71) Applicant: GM GLOBAL TECHNOLOGY OPERATIONS LLC, Detroit, MI (US)

(72) Inventors: Bhapinder Puri, Troy, MI (US); David M. Hreha, Madison Heights, MI (US); George Spears, Grand Blanc, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 51 days.

(21) Appl. No.: 14/668,083

(22) Filed: Mar. 25, 2015

(65) Prior Publication Data

US 2016/0280065 A1 Sep. 29, 2016

(51) Int. Cl.
| | |
|---|---|
| *F16D 11/14* | (2006.01) |
| *B60K 17/02* | (2006.01) |
| *B60K 17/344* | (2006.01) |
| *B60K 17/35* | (2006.01) |

(52) U.S. Cl.
CPC .............. *F16D 11/14* (2013.01); *B60K 17/02* (2013.01); *B60K 17/344* (2013.01); *B60K 17/35* (2013.01)

(58) Field of Classification Search
CPC ...... B60K 17/348; B60K 17/02; B60K 17/34; B60K 17/344; B60K 17/346; F16D 11/14; F16D 22/12; F16D 22/14; F16D 2200/073
See application file for complete search history.

(56) References Cited

U.S. PATENT DOCUMENTS

| | | | |
|---|---|---|---|
| 4,699,235 A | 10/1987 | Anderson | |
| 5,845,546 A * | 12/1998 | Knowles | B60K 23/04 74/650 |
| 7,316,304 B2 | 1/2008 | Heravi et al. | |
| 8,597,150 B1 | 12/2013 | Downs et al. | |
| 2003/0057007 A1 | 3/2003 | Stevens | |
| 2009/0321170 A1* | 12/2009 | Guo | B60K 17/16 180/247 |
| 2013/0310209 A1* | 11/2013 | Downs | B60K 23/08 475/221 |
| 2015/0011349 A1* | 1/2015 | Downs | B60K 17/35 475/198 |
| 2015/0027245 A1* | 1/2015 | Perakes | B60K 25/06 74/15.82 |

(Continued)

OTHER PUBLICATIONS

Technical Service Bulletin: How Cold Temperature Affect Automatic Transmission Efficiencies, Nov. 3, 2004, AMSOIL, https://www.amsoil.com/techservicesbulletin/Drivetrain/TSB%20DT-2004-11-01%20How%20Cold%20Temperatures%20Affect%20Auto%20Trans%20Efficiency.pdf.*

*Primary Examiner* — Jacob S Scott
*Assistant Examiner* — Lori Wu
(74) *Attorney, Agent, or Firm* — Cantor Colburn LLP

(57) ABSTRACT

A front axle shift mechanism configured to be operably associated with a front axle housing having a front differential and a first lubricant is provided. The front axle shift mechanism includes a disconnect feature housing defining an inner cavity to house a shifting mechanism configured to selectively provide power to front wheels of the vehicle, the shifting mechanism configured to rotatably couple to the front differential. The inner cavity is configured to receive a second lubricant to facilitate providing lubrication to the first clutch gear and the second clutch gear. The second lubricant is fluidly separate from the first lubricant.

20 Claims, 3 Drawing Sheets

(56) References Cited

U.S. PATENT DOCUMENTS

| | | | |
|---|---|---|---|
| 2015/0057125 A1* | 2/2015 | Pump | F16H 48/08 |
| | | | 475/160 |
| 2015/0219197 A1* | 8/2015 | Trost | F16H 48/34 |
| | | | 475/150 |
| 2016/0178048 A1* | 6/2016 | Lippert | F16H 57/0483 |
| | | | 475/160 |

* cited by examiner

REDUCED DRAG FRONT AXLE SHIFT MECHANISM

FIELD OF THE INVENTION

The subject invention relates to four wheel drive axle shift mechanisms and, more specifically, to an axle shift mechanism with independent lubrication.

BACKGROUND

Four-wheel drive vehicles provide improved traction on roads such as those covered in snow, ice, and mud. Four-wheel drive vehicles may be provided with an axle shift mechanism to selectively disconnect a secondary driving axle in order to provide a two-wheel drive mode when using four-wheel drive mode is not beneficial. Some four-wheel drive axle shift mechanisms may utilize axle gear lubricant to lubricate the shift mechanism. However, in some low temperature conditions, it may be difficult for the four-wheel drive shift to occur due to drag that may result from the cold, lower viscosity axle gear lube.

SUMMARY OF THE INVENTION

In one aspect, a front axle shift mechanism configured to be operably associated with a front axle housing having a front differential and a first lubricant is provided. The front axle shift mechanism includes a disconnect feature housing defining an inner cavity to house a shifting mechanism configured to selectively provide power to front wheels of the vehicle, the shifting mechanism configured to rotatably couple to the front differential. The inner cavity is configured to receive a second lubricant to facilitate providing lubrication to the first clutch gear and the second clutch gear. The second lubricant is fluidly separate from the first lubricant.

In another aspect, a vehicle is provided. The vehicle includes a body, a front axle housing having a front differential and a first lubricant disposed therein, and a front axle shift mechanism. The front axle shift mechanism includes a disconnect feature housing defining an inner cavity to house a shifting mechanism configured to selectively provide power to front wheels of the vehicle, the shifting mechanism configured to rotatably couple to the front differential. A second lubricant is disposed in the inner cavity to facilitate providing lubrication to the first clutch gear and the second clutch gear. The second lubricant is fluidly separate from the first lubricant.

In yet another aspect, a method of manufacturing a front axle shift mechanism configured to be operably associated with a front axle housing having a front differential and a first lubricant is provided. The method includes providing a disconnect feature housing defining an inner cavity to house a shifting mechanism configured to selectively provide power to front wheels of the vehicle, the shifting mechanism configured to rotatably couple to the front differential, and providing a second lubricant in the inner cavity to facilitate providing lubrication to the shifting mechanism.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DETAILED DESCRIPTION

Figure 1:
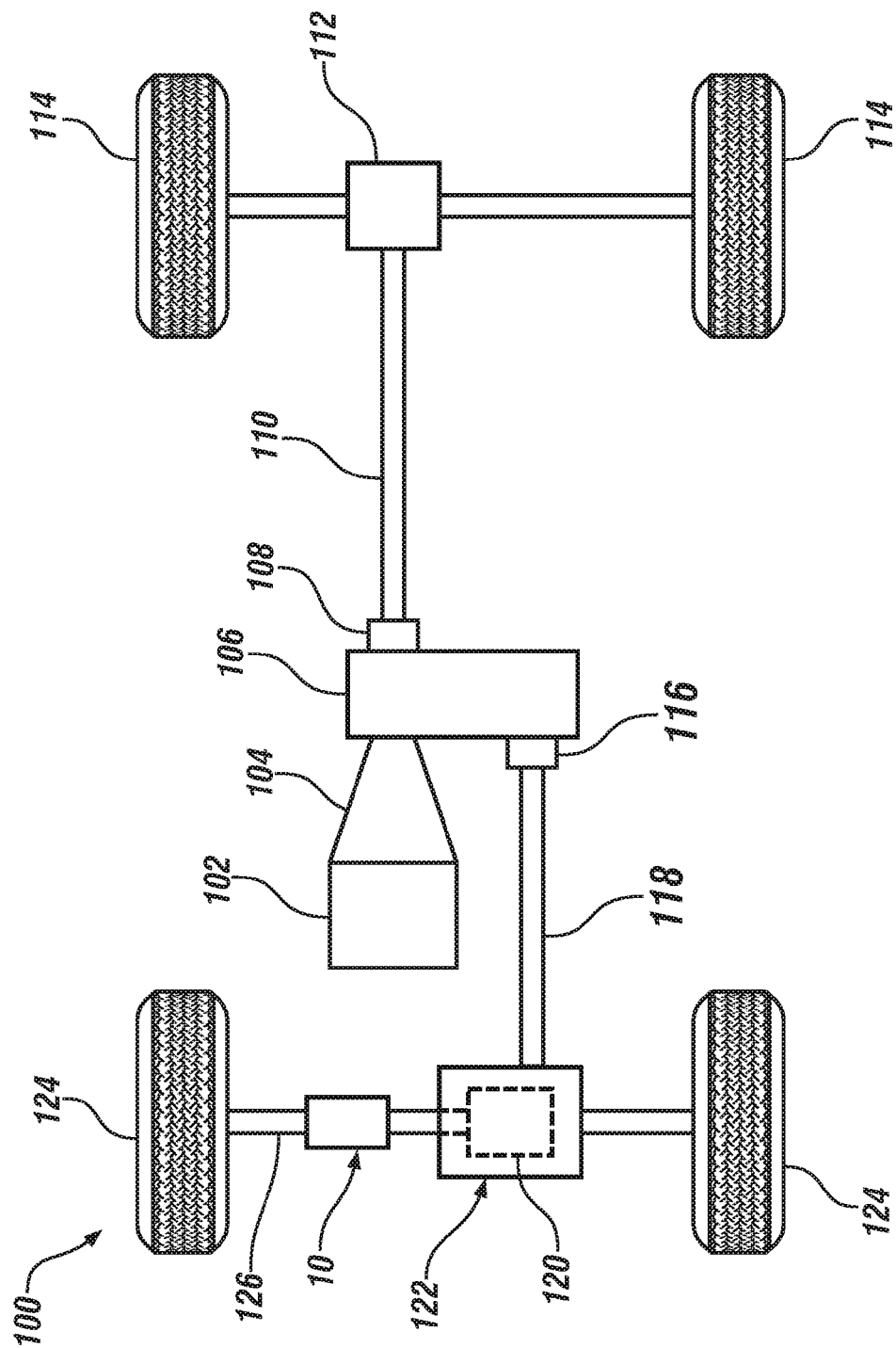
FIG. 1 is a schematic view of an exemplary vehicle.

FIG. 1 illustrates a schematic view of an exemplary part-time four-wheel drive vehicle 100 that generally includes an internal combustion engine 102, a transmission 104, and a transfer case 106 to receive drive torque from engine 102 and transmission 104. A transfer case first output member 108 is drive connected to a rear driveshaft 110, which in turn is drivingly connected to a rear differential 112. The rear differential 112 drives rear wheels 114 in a known manner. A transfer case second output member 116 is drive connected to a front drive shaft 118, which in turn is connected to a front differential gear assembly 120 disposed in a front axle housing 122. Front differential gear assembly 120 selectively drives front wheel 124 utilizing a four-wheel drive front axle shift mechanism 10.

Figure 2:
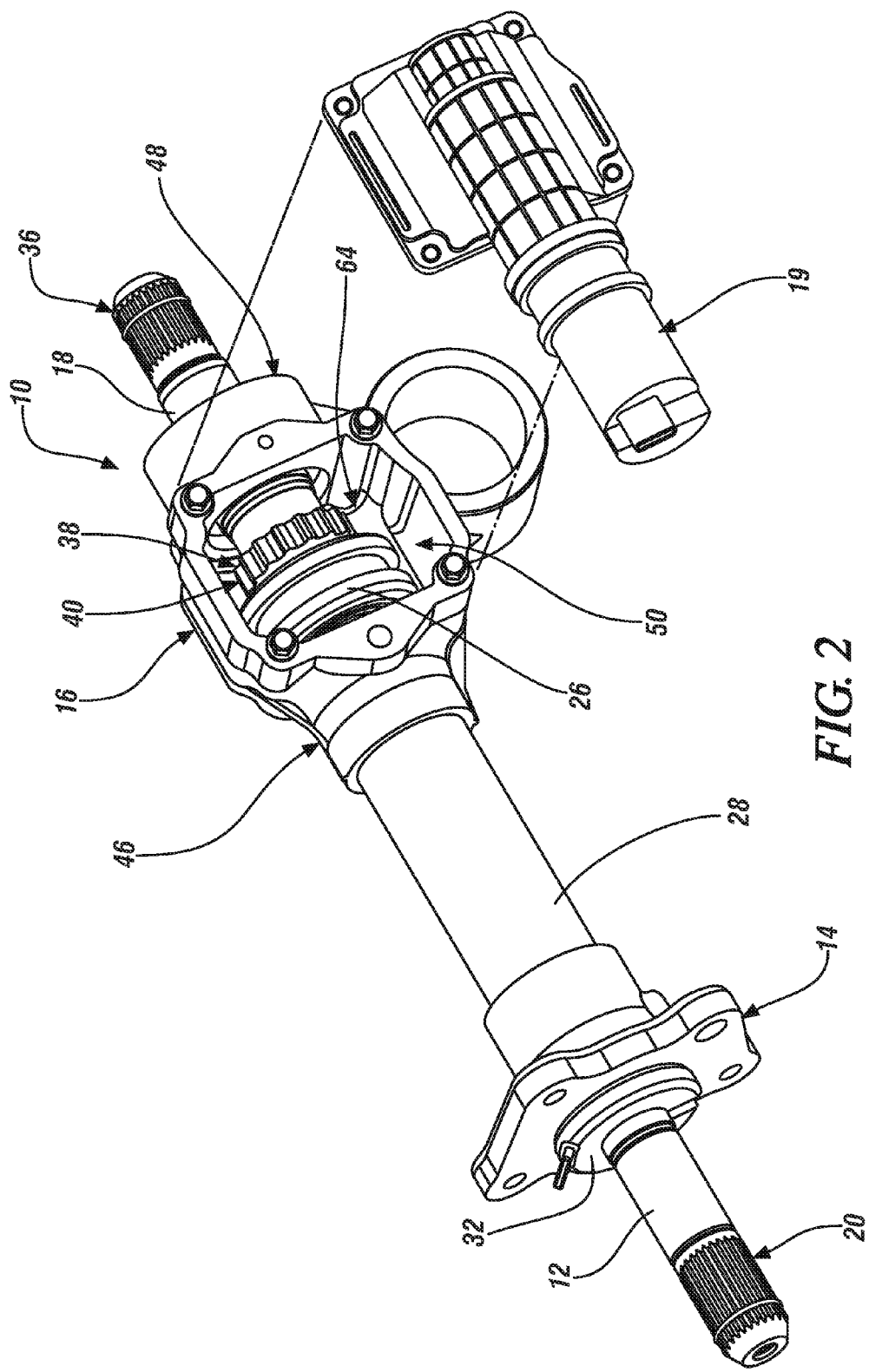
FIG. 2 is a perspective view of an exemplary front axle shift mechanism shown in FIG. 1.
Figure 3:
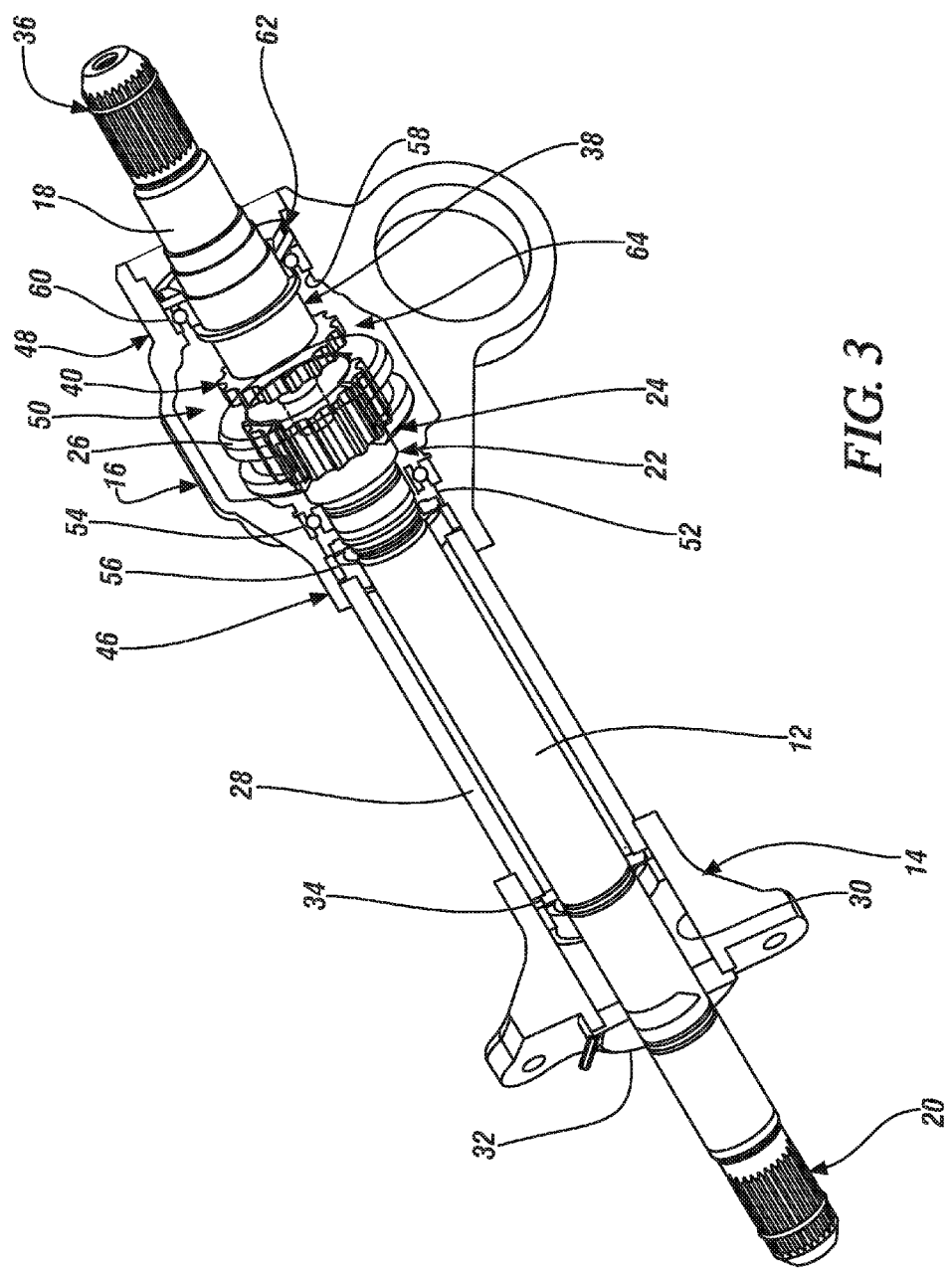
FIG. 3 is a partial, cross-sectional view of the front axle shift mechanism shown in FIG. 2.

FIGS. 2 and 3 illustrate an exemplary front axle shift mechanism 10 operably associated with main axle housing 122 (FIG. 1). Front axle shift mechanism 10 generally includes a clutch shaft 12, a flange 14, a disconnect feature housing 16, an extension shaft 18, and a front axle actuator 19 assembled thereto. In one embodiment, front axle shift mechanism 10 is provided as a unitary disconnect assembly configured to couple to front axle housing 122.

Clutch shaft 12 includes a first end 20 and a second end 22. First end 20 is splined and is configured to couple to front differential gear assembly 120. Second end 22 includes first clutch gear 24 configured to selectively engage extension shaft 18 to transmit a rotational force thereto. A clutch collar 26 is retained for rotation with an axial sliding movement on first clutch gear 24. As shown in FIG. 3, clutch shaft 12 extends through a tube or sleeve 28 disposed between flange 14 and disconnect feature housing 16.

Flange 14 is disposed about clutch shaft 12 and is configured for coupling to front axle housing 122. Flange 14 includes an inner diameter 30 to receive clutch shaft 12, a removable plug 32 to hold shaft 12 in place during shipment, and a seal 34 (FIG. 3) to prevent axle lubrication in front axle housing 122 from traveling down sleeve 28 to disconnect feature housing 16.

Extension shaft 18 includes a first end 36 and a second end 38. First end 36 is splined and is configured to couple to a half shaft 126 (FIG. 1) coupled to front wheel 124. Second end 38 includes a second clutch gear 40 for coupling to first clutch gear 24, thereby connecting clutch shaft 12 and extension shaft 18 for common rotation. In this position, front differential gear assembly 120 may transfer power from transfer case 106 to front wheels 124.

Disconnect feature housing 16 includes a first end 46, a second end 48 and an inner cavity 50 disposed therebetween. First end 46 includes an inner diameter 52 to receive clutch shaft second end 22, a bearing 54, and a seal 56 (FIG. 3). Bearing 54 rotatably supports clutch shaft 12, and seal 56 prevents lubricant in cavity 50 from traveling down sleeve 28 to front axle housing 122. As such, seals 34 and 56 prevent mixing of the front axle lubricant and the disconnect feature lubricant such that front axle housing 122 and disconnect feature housing 16 include fluidly separate lubrication systems.

Second end 48 includes an inner diameter 58 to receive extension shaft second end 38, a bearing 60, and a seal 62

(FIG. 3). Bearing 60 rotatably supports extension shaft 18, and seal 62 prevents lubrication in cavity 50 from traveling outward toward wheel 124.

Inner cavity 50 houses a disconnect shift system 64 that includes selectively engageable first clutch gear 24, clutch collar 26, and second clutch gear 40. As described, inner cavity 50 houses a volume of lubricant for lubricating shift system 64 and bearings 54, 60. This is in contrast to some known systems which rely on splashing of the axle lube from a front axle housing for lubrication purposes. Further, in contrast to axle lube, disconnect feature lubrication is a lower viscosity lubricant, which reduces drag under low temperature conditions (e.g., between approximately −20° F. and approximately −40° F.). Moreover, the disconnect feature lubricant reduces shift efforts on a manual transfer case (not shown) by lowering rotating inertia under the low temperature conditions, and reduces axle lube volume in the main sump of the front axle housing 122 since the axle lube is not required to be directed into sleeve 28.

In one embodiment, the disconnect feature lubricant is Automatic Transmission Fluid (ATF). In another embodiment, the disconnect feature lubricant is a lubricant having a Brookfield Viscosity of between 5,000 Cp and 25,000 Cp at −40° F. In yet another embodiment, the disconnect feature lubricant is a lubricant having a Brookfield Viscosity of between approximately 5,000 Cp and approximately 25,000 Cp at −40° F. In one embodiment, the disconnect feature lubricant is a lubricant having a Brookfield Viscosity of between 10,000 Cp and 20,000 Cp at −40° F. In another embodiment, the disconnect feature lubricant is a lubricant having a Brookfield Viscosity of between approximately 10,000 Cp and approximately 20,000 Cp at −40° F. In one embodiment, the disconnect feature lubricant is a lubricant having a Brookfield Viscosity of 15,000 Cp at −40° F. In another embodiment, the disconnect feature lubricant is a lubricant having a Brookfield Viscosity of approximately 15,000 Cp at −40° F. The axle lubricant of front axle housing 122 may have a Brookfield Viscosity of 60,000 Cp at −40° F.

Front axle actuator 19 selectively shifts clutch collar 26 from an uncoupled first position (FIGS. 2 and 3) to a coupled second position (not shown) where clutch collar 26 couples first clutch gear 24 for rotation with second clutch gear 40, thereby connecting clutch shaft 12 and extension shaft 18 for common rotation. As such, disconnect shift system 64 has a first operating mode for a two-wheel drive operation of vehicle 100 and a second operating mode for a four-wheel drive operation of vehicle 100.

In the first operating mode, shafts 12, 18 are not coupled and rotate independently. In this first operating mode, rolling movement of front wheels 124 does not drive front differential gear assembly 120. In the second operating mode, where front axle actuator 19 shifts clutch collar 26 to the second position to couple shafts 12 and 18 for co-rotation, front wheels 124 are operably coupled to engine 102.

A method of manufacturing front axle shift mechanism 10 includes providing clutch shaft 12, flange 14, disconnect feature housing 16, extension shaft 18, and front axle actuator 19. Clutch shaft 12 includes first end 20 and second end 22 having first clutch gear 24 and clutch collar 26. Flange 14 may be coupled to front axle housing 122 and includes sleeve 28, bearing 32, and seal 34 disposed within flange inner diameter 30. Extension shaft 18 includes first end 36 and second end 38 having second clutch gear 40. Disconnect feature housing 16 defines inner cavity 50 configured to house first clutch gear 24, clutch collar 26, and second clutch gear 40. Inner cavity 50 is provided with a lubricant different and separate from axle lubricant in front axle housing 122. One or more seals 34, 56 are provided to fluidly separate the inner cavity lubricant and the axle lubricant. Front axle actuator 19 is operably coupled to clutch collar 26 to selectively couple first clutch gear 24 and second clutch gear 40.

Described herein are systems and methods for lubricating a front axle shift mechanism. A lower viscosity lubricant is used exclusively within a disconnect feature housing of the front axle shift mechanism, which reduces drag on the front axle shift mechanism, particularly under cold temperature conditions. Further, the system reduces the volume of axle lubrication contained within the main axle housing, which lowers drag on the vehicle and results in better fuel economy.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A front axle shift mechanism configured to be operably associated with a front axle housing having a front differential and being receptive of a first lubricant, the front axle shift mechanism comprising:
   a clutch shaft, including a first clutch gear;
   an extension shaft including a second clutch gear;
   a clutch collar slidingly arranged on one of the first clutch gear and the second clutch gear; and
   a disconnect feature housing operatively coupled to the front axle housing, the disconnect feature housing including an inner cavity, and a shifting mechanism arranged within the inner cavity and operatively connected with the clutch collar, the shifting mechanism being operable to slide the clutch collar into engagement with the other of the first clutch gear and the second clutch gear to selectively connect and disconnect the clutch shaft and with the extension shaft to transmit rotational power to front wheels from a source of power in a vehicle, the shifting mechanism configured to rotatably couple to the front differential,
   the inner cavity being receptive of a second lubricant to facilitate providing lubrication to the first clutch gear and the second clutch gear, wherein the inner cavity of the disconnect feature is fluidically isolated from the front axle housing.

2. The front axle shift mechanism of claim 1,
   wherein, the clutch shaft includes a first end configured to couple to the front differential, and a second end supporting the first clutch gear; and
   wherein the extension shaft includes a first end and a second end supporting the second clutch gear,
   wherein the disconnect feature housing is fluidly sealed to contain the second lubricant within the inner cavity.

3. The front axle shift mechanism of claim 2, wherein the disconnect feature housing includes a first end and a second end, the first end having a first inner diameter to receive the clutch shaft and a first seal, the second end having a second inner diameter to receive the extension shaft and a second seal, the first and second seals configured to facilitate sealing the second lubricant within the inner cavity.

4. The front axle shift mechanism of claim 2, wherein the clutch collar is configured to selectively couple the first clutch gear and the second clutch gear such that the clutch shaft and the extension shaft are coupled for co-rotation.

5. The front axle shift mechanism of claim 1, wherein the second lubricant is different than the first lubricant.

6. The front axle shift mechanism of claim 1, wherein the second lubricant is Automatic Transmission Fluid.

7. The front axle shift mechanism of claim 1, wherein the second lubricant has a Brookfield Viscosity of between approximately 5,000 Cp and approximately 25,000 Cp at −40° F.

8. The front axle shift mechanism of claim 1, wherein the second lubricant has a Brookfield Viscosity of between approximately 10,000 Cp and approximately 25,000 Cp at −40° F.

9. The front axle shift mechanism of claim 1, wherein the second lubricant has a Brookfield Viscosity of approximately 15,000 Cp at −40° F.

10. A vehicle comprising:
a body;
a front axle housing having a front differential and a first lubricant disposed therein; and
a front axle shift mechanism comprising:
a clutch shaft, including a first clutch gear;
an extension shaft including a second clutch gear;
a clutch collar slidingly arranged on one of the first clutch gear and the second clutch gear; and
a disconnect feature housing operatively coupled to the front axle housing, the disconnect feature housing including an inner cavity receptive to a second lubricant, and a shifting mechanism arranged within the inner cavity and operatively connected with the clutch collar, the shifting mechanism being operable to slide the clutch collar into engagement with the other of the first clutch gear and the second clutch gear to selectively connect and disconnect the clutch shaft and with the extension shaft to transmit rotational power to front wheels from a source of power in the vehicle, the shifting mechanism configured to rotatably couple to the front differential, wherein the disconnect housing is fluidically isolated from the front axle housing.

11. The vehicle of claim 10,
wherein the clutch shaft includes a first end configured to couple to the front differential, and a second end supporting the first clutch gear; and
wherein the extension shaft includes a first end and a second end supporting the second clutch gear.

12. The vehicle of claim 11, wherein the second lubricant is different than the first lubricant.

13. The vehicle of claim 11, wherein the disconnect feature housing includes a first end and a second end, the first end having a first inner diameter to receive the clutch shaft and a first seal, the second end having a second inner diameter to receive the extension shaft and a second seal, the first and second seals configured to facilitate sealing the second lubricant within the inner cavity.

14. The vehicle of claim 11, wherein the clutch collar is configured to selectively couple the first clutch gear and the second clutch gear such that the clutch shaft and the extension shaft are coupled for co-rotation.

15. The vehicle of claim 10, wherein the second lubricant is Automatic Transmission Fluid.

16. The vehicle of claim 10, wherein the second lubricant has a Brookfield Viscosity of between approximately 5,000 Cp and approximately 25,000 Cp at −40° F.

17. The vehicle of claim 10, wherein the second lubricant has a Brookfield Viscosity of between approximately 10,000 Cp and approximately 25,000 Cp at −40° F.

18. The vehicle of claim 10, wherein the second lubricant has a Brookfield Viscosity of approximately 15,000 Cp at −40° F., and the first lubricant has a Brookfield Viscosity of approximately 60,000 Cp at −40° F.

19. A method of manufacturing a front axle shift mechanism configured to be operably associated with a front axle housing having a front differential and a first lubricant, the method comprising:
providing a disconnect feature housing defining an inner cavity fluidically isolated from the front axle housing to house a shifting mechanism configured to selectively shift a clutch collar to connect a first clutch gear with a second clutch gear to selectively connect and disconnect a clutch shaft with an extension shaft to transmit rotational power to front wheels with a source of power in a vehicle, the shifting mechanism configured to rotatably couple to the front differential; and
providing a second lubricant in the inner cavity to facilitate providing lubrication to the shifting mechanism.

20. The method of claim 19, further comprising:
coupling a first end of the clutch shaft to the front differential, a second end of the clutch shaft having the first clutch gear
wherein the extension shaft includes a first end and a second end having the second clutch gear, wherein the first and second clutch gears comprise at least a portion of the shifting mechanism; and
disposing the first and second clutch gears in the inner cavity.

* * * * *